(12) United States Patent
Castañeda et al.

(10) Patent No.: US 11,137,621 B1
(45) Date of Patent: Oct. 5, 2021

(54) MAGNETIC TEMPLE HINGE FOR EYEWEAR

(71) Applicants: Julio Cesar Castañeda, Venice, CA (US); Samuel Bryson Thompson, Venice, CA (US)

(72) Inventors: Julio Cesar Castañeda, Venice, CA (US); Samuel Bryson Thompson, Venice, CA (US)

(73) Assignee: Snap Inc., Santa Monica, CA (US)

(*) Notice: Subject to any disclaimer, the term of this patent is extended or adjusted under 35 U.S.C. 154(b) by 68 days.

(21) Appl. No.: 16/162,814

(22) Filed: Oct. 17, 2018

Related U.S. Application Data

(60) Provisional application No. 62/594,653, filed on Dec. 5, 2017.

(51) Int. Cl.
    *G02C 5/22* (2006.01)
    *G02C 7/08* (2006.01)
    *A45C 11/04* (2006.01)
    *G02C 11/00* (2006.01)

(52) U.S. Cl.
    CPC .............. *G02C 5/22* (2013.01); *A45C 11/04* (2013.01); *G02C 7/083* (2013.01); *G02C 11/10* (2013.01); *G02C 2200/02* (2013.01)

(58) Field of Classification Search
    CPC .... G02C 2200/02; G02C 5/22; G02C 5/2209; G02C 7/083; G02C 9/00; G02C 11/00; A45C 11/04

USPC .................................... 351/63, 111, 114, 121
See application file for complete search history.

(56) References Cited

U.S. PATENT DOCUMENTS

| | | | |
|---|---|---|---|
| 9,482,882 B1* | 11/2016 | Hanover | H01R 13/6205 |
| 9,482,883 B1* | 11/2016 | Meisenholder | G02C 5/2272 |
| 9,726,904 B1 | 8/2017 | Lin | |
| 9,829,719 B1* | 11/2017 | Neren | G02C 5/2209 |
| 2009/0195747 A1* | 8/2009 | Insua | G02C 5/146 351/116 |
| 2014/0268011 A1* | 9/2014 | Larmer | G02C 5/2209 351/121 |
| 2015/0309331 A1* | 10/2015 | Poole | G02C 5/146 351/116 |

FOREIGN PATENT DOCUMENTS

EP            1969418 B1      3/2014

* cited by examiner

*Primary Examiner* — Jordan M Schwartz
(74) *Attorney, Agent, or Firm* — Culhane Meadows PLLC; Stephen J. Weed

(57) ABSTRACT

Eyewear includes a frame configured to support an optical element and a temple pivotably connected to one side of the frame by a hinge. The temple is movable with respect to the frame between folded and unfolded configurations. A first permanent magnet is either disposed on or at least partially embedded within the frame at a location adjacent the hinge. A second permanent magnet (or ferromagnetic member) is either disposed on or at least partially embedded within the temple at a location adjacent the hinge. The permanent magnets are attracted to each other such that magnetic attraction retains the temple in the unfolded configuration when the temple is moved into the unfolded configuration.

7 Claims, 3 Drawing Sheets

MAGNETIC TEMPLE HINGE FOR EYEWEAR

CROSS-REFERENCE TO RELATED APPLICATION

The application claims priority to U.S. Provisional Patent App. No. 62/594,653, filed Dec. 5, 2017, the entirety of which is incorporated by reference herein.

TECHNICAL FIELD

The present invention relates generally to eyewear, electronics enabled eyewear, and an apparatus for retaining temples of the eyewear in an unfolded configuration.

BACKGROUND

A persistent problem with eyewear (such as eye glasses) is that the temples tend to loosen with respect to the frame over time. Initially, when the eye glasses are new, the temples open and close with sufficient friction to automatically retain the temples in place in both an open and a closed configuration. Over time, however, as the hinge screws that connect the temples to the frame gradually loosen due to normal use, the resultant reduction in friction of the hinges leads to loose temples that no longer remain in the open and closed configuration.

SUMMARY OF THE INVENTION

According to one example of the invention, eyewear comprises a frame configured to support an optical element, a temple pivotably connected to one side of the frame by a hinge, the temple being movable with respect to the frame between folded and unfolded configurations, a first permanent magnet either disposed on or at least partially embedded within the frame at a location adjacent the hinge, and a second permanent magnet either disposed on or at least partially embedded within the temple at a location adjacent the hinge. The permanent magnets are attracted to each other such that magnetic attraction retains the temple in the unfolded configuration when the temple is moved into the unfolded configuration.

According to another example of the invention, eyewear comprises a frame configured to support an optical element, a temple pivotably connected to one side of the frame by a hinge, the temple being movable with respect to the frame between folded and unfolded configurations, a permanent magnet either disposed on or at least partially embedded within one of the frame and the temple at a location adjacent the hinge, and a ferromagnetic member either disposed on or at least partially embedded within the other of the frame and the temple at a location adjacent the hinge. The ferromagnetic member is attracted to the permanent magnet so as to retain the temple in the unfolded configuration by magnetic attraction when the temple is moved to the unfolded configuration.

According to yet another example of the invention, eyewear comprises a frame configured to support an optical element, a temple pivotably connected to one side of the frame by a hinge, the temple being movable with respect to the frame between folded and unfolded configurations, a permanent magnet either disposed on or at least partially embedded within the frame at a location adjacent the hinge, and a malleable core wire at least partially embedded within the temple, wherein at least a portion of the core wire that is positioned adjacent the hinge is composed of a ferromagnetic material. The ferromagnetic material of the core wire is attracted to the permanent magnet so as to retain the temple in the unfolded configuration by magnetic attraction when the temple is moved to the unfolded configuration.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1B:
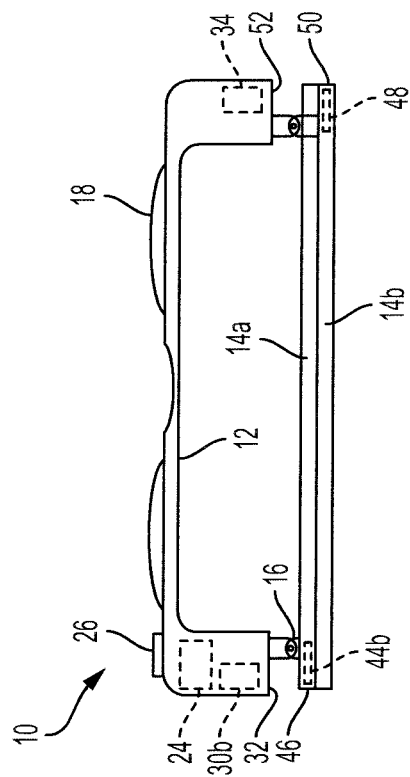
FIG. 1B depicts a top plan view of the electronics enabled eyewear of FIG. 1A in a folded configuration.

In the following detailed description, numerous specific details are set forth by way of examples in order to provide a thorough understanding of the relevant teachings. However, it should be apparent to those skilled in the art that the present teachings may be practiced without such details.

This description of the exemplary embodiments that follows is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both removable or rigid attachments or relationships, unless expressly described otherwise.

As used herein, a magnet is a material or object that produces a magnetic field. A permanent magnet is an object made from a material that is magnetized and creates its own persistent magnetic field. Materials that can be magnetized, which are also the ones that are strongly attracted to a magnet, are referred to herein as ferromagnetic.

Figure 1A:
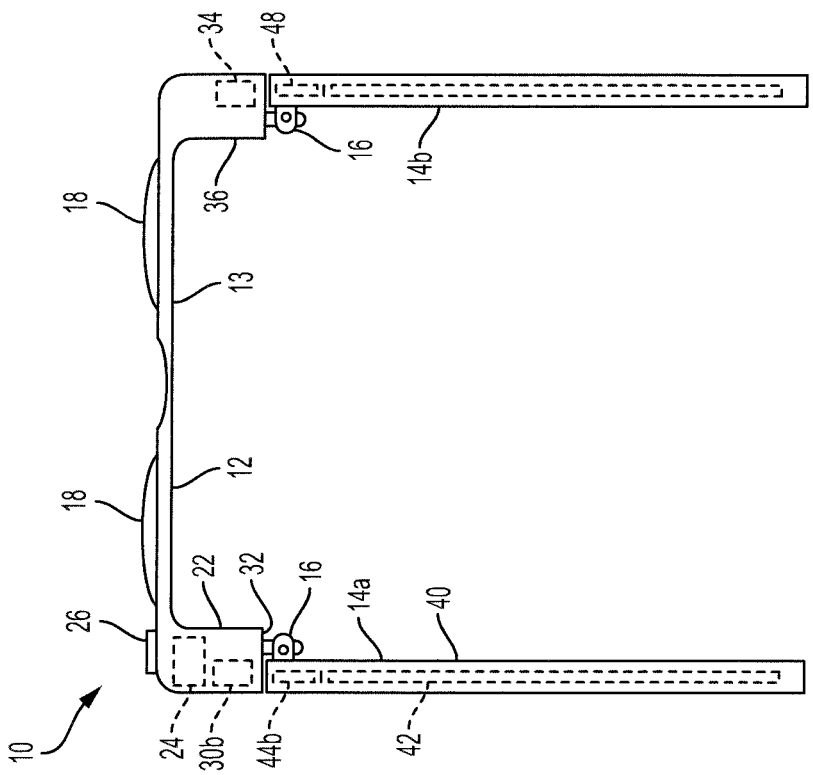
FIG. 1A depicts a top plan view of electronics enabled eyewear in an unfolded configuration according to an embodiment of the invention, wherein the eyewear is shown schematically.
Figure 1C:
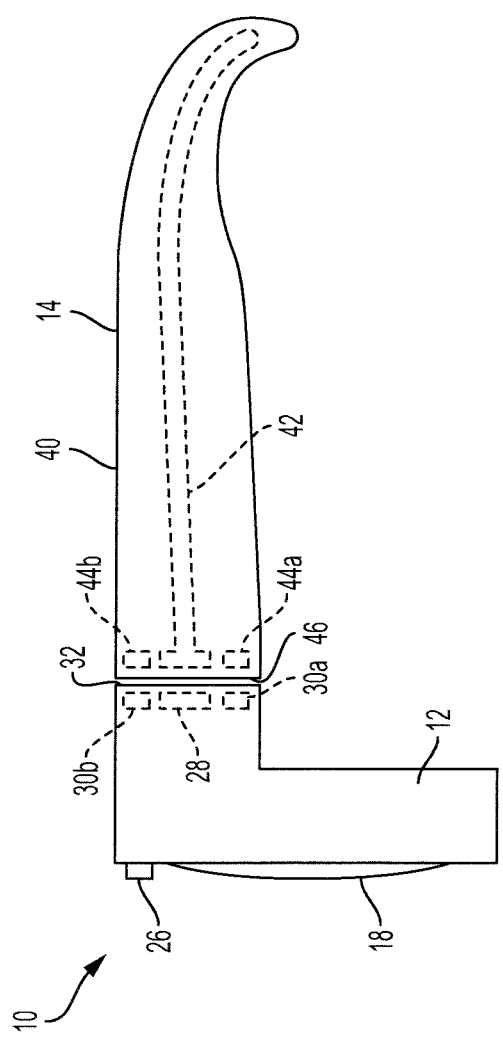
FIG. 1C depicts a side elevation view of the electronics enabled eyewear of FIG. 1A in an unfolded configuration.

FIGS. 1A-1C show eyewear 10 according to one embodiment.

The eyewear 10 generally includes a frame 12 and two temples 14a and 14b pivotably connected to opposing sides of the frame 12 by hinges 16. The frame 12 includes a body 13 that supports two optical elements 18. Each optical element 18 may be, for example, a lens, a transparent piece of glass or plastic, a screen, a projector, a display, or other device for presenting visual images and/or through which visual images may be perceived by a user.

At least one side 22 of the frame 12 may be enlarged to accommodate various electronic components 24 such as a battery, a wireless transceiver, a data storage means, and a processor (not shown). The electronic components 24 are electrically connected to a camera 26 having an outwardly facing lens and a power connector 28 (see FIG. 1C) for delivering power to the components 24 and the camera 26. Details of the optical and electronics components are described in greater detail in U.S. Pat. No. 9,726,904, which is incorporated by reference herein in its entirety and for all purposes.

On a side 22 of the frame 12, one permanent magnet 30*a* is positioned directly below the power connector 28, and another permanent magnet 30*b* is positioned directly above the power connector 28. The power connector 28 and magnets 30*a* and 30*b* are configured to mate with a power plug (not shown) for transferring power to the battery of the eyewear 10. The magnets 30*a*, 30*b* and the power connector 28 are at least partially embedded within the side 22 of the frame 12. A magnetic surface of the magnets 30*a*, 30*b* may be exposed on and flush with the surface 32 of the frame 12 that faces the temple 14*a* (i.e., in the unfolded configuration of the eyewear 10 shown in FIG. 1C) in order to maximize the attractive force imparted by the magnets 30*a*, 30*b*.

Another permanent magnet 34 is at least partially embedded within the enlarged side 36 at the opposing end of the frame 12.

Figure 3:
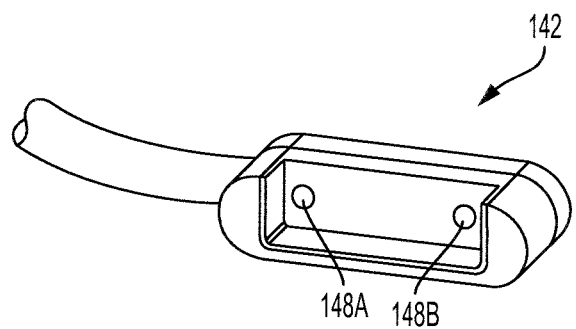
FIG. 3 depicts a plug for connecting to the eyewear of FIG. 1A.

Referring to FIG. 3, the magnets 30*a* and 30*b* are capable of connecting to magnets 148A and 148B on a power cord 142 to ensure a secure physical connection between the power cord 142 and the folded eyewear 10. The power cord 142 can used to charge the batteries in the eyewear 10 as well as transmit information to and from the eyewear 10.

Figure 4A:
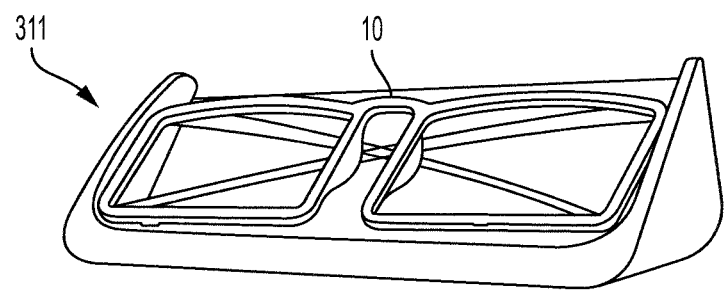
FIG. 4A depicts an isometric view of the eyewear stowed in a case.
Figure 4B:
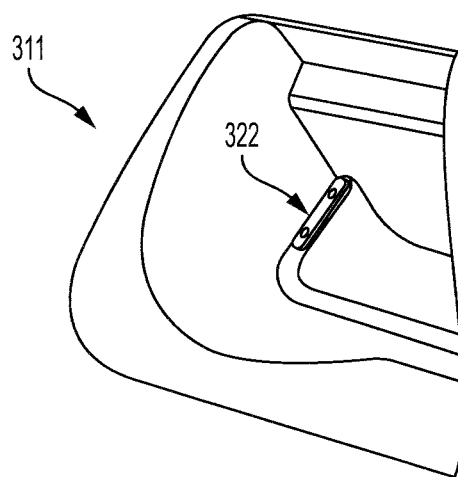
FIG. 4B depicts a detailed isometric view of the case of FIG. 4A.

Referring to FIGS. 4A and 4B, the magnets 30*a* and 30*b* and the magnet 34 connect to magnets 322 (one shown) within the interior compartment of an eyewear storage case 311 to ensure a secure physical connection between the folded eyewear 10 and the eyewear storage case 311. The eyewear storage case 311 can be used to charge the batteries in the eyewear 10 as well as transmit information to and from the eyewear 10.

Described hereinafter is another use for the magnets 30*a*, 30*b* and 34.

Referring still to FIGS. 1A-1C, each temple 14*a* and 14*b* generally includes a body 40 and a malleable core wire 42 embedded in the body 40. In use, a user can adjust the shape of the temple 14*a*, 14*b* by bending the body 40 and the malleable core wire 42 inside the body 40. In the temple 14*a*, two permanent magnets 44*a* and 44*b* are at least partially embedded in the body 40. A magnetic surface of the magnets 44*a* and 44*b* may be exposed on and flush with the surface 46 of the temple 14*a* that faces the surface 32 of the frame 12 in the unfolded configuration of the eyewear 10.

The poles of the magnets 44*a*, 44*b* face the opposite poles of the magnets 30*a*, 30*b*, respectively, so that the magnets 30*a*, 30*b* attract the magnets 44*a*, 44*b*, respectively. Accordingly, in the open, unfolded configuration of the eyewear 10 shown in FIG. 1A, the magnets 44*a*, 44*b* magnetically attract the magnets 30*a*, 30*b*, respectively, thereby retaining the temple 14*a* in the unfolded configuration shown in FIG. 1A. Thus, magnetic attraction retains the temple 14*a* in the unfolded configuration even if the screw of the hinge 16 loosens over time.

The opposite temple 14*b* also includes a magnet 48. A magnetic surface of the magnet 48 may be exposed on and flush with the surface 50 of the temple 14*b* that faces the surface 52 (see FIG. 1B) of the frame 12 in the unfolded configuration of the eyewear 10. The pole of the magnet 48 faces the opposite pole of the magnet 34 so that the magnet 34 attracts the magnet 48 in the unfolded configuration of the eyewear 10. Thus, like for the temple 14*a*, magnetic attraction retains the temple 14*b* in the unfolded configuration even if the screw of the hinge 16 loosens over time.

The magnetic action of the magnets 44*a*, 44*b* and 48 provide the user with a solid snap and hold feel when the temples 14*a* and 14*b* are rotated into the unfolded configuration.

According to another embodiment, items 44*a*, 44*b* and 48 are each composed of a ferromagnetic material (as opposed to being permanent magnets). Thus, items 44*a*, 44*b* and 48 may also be referred to herein as ferromagnetic members. The ferromagnetic material may be a magnetic grade of stainless steel.

According to yet another embodiment, items 30*a*, 30*b* and 34 are each composed of a ferromagnetic material (as opposed to being permanent magnets), and items 44*a*, 44*b* and 48 are permanent magnets. Thus, items 30*a*, 30*b* and 34 may also be referred to herein as ferromagnetic members.

Figure 2:
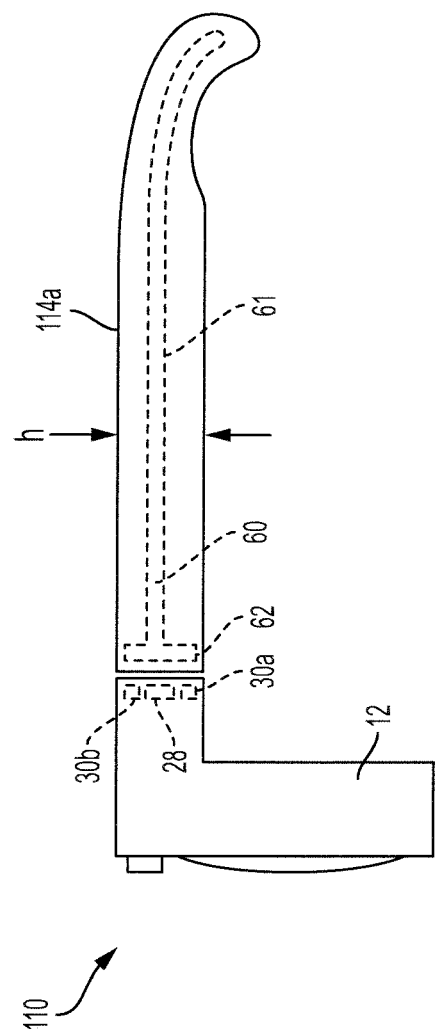
FIG. 2 depicts a side elevation view of electronics enabled eyewear in an unfolded configuration and according to another embodiment of the invention.

FIG. 2 depicts a side elevation view of electronics enabled eyewear 110 in an unfolded configuration and according to still another exemplary embodiment of the invention. The eyewear 110 are similar to the eyewear 10 of FIGS. 1A-1C and, thus, we now describe only significant differences.

Each temple 114*a* and 114*b* (referred to either individually or collectively as temple(s) 114) of the eyewear 110 includes a core wire 60 that is composed of a ferromagnetic material. Each core wire 60 includes an elongated portion 61 that extends nearly the entire length of the temple, and an enlarged end 62. The enlarged end 62 of the core wire 60 positioned adjacent the frame 12 is enlarged as compared to the end of the core wire 42 of FIG. 1A. More particularly, the end 62 extends nearly the entire height 'h' of the temple 114. The height of the end 62 is greater than the height of the elongated portion 61 and extends both above and below the elongated portion 61. The depth dimension of the end 62 may be greater than that of the elongated portion 61. Also, the cross-sectional area of the end 62 may be greater than that of the elongated portion 61. A surface of the end 62 may be exposed on and flush with the surface of the temple 114 that faces the surface 32 of the frame 12 in the unfolded configuration of the eyewear 10.

In use, the magnets 30*a* and 30*b* of the frame 12 attract the enlarged end 62 of the core wire 60 of the temple 114*a* thereby retaining the temple 114*a* in the unfolded configuration shown in FIG. 1A. Similarly, the temple 114*b* (not shown) includes a substantially similar core wire 60, and the magnet 34 of the frame 12 attracts the enlarged end 62 of the core wire 60 thereby retaining the temple 114*b* in the unfolded configuration.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. Eyewear comprising:
   a frame configured to support an optical element,
   a power connector at least partially embedded within the frame for supplying power to electronic components associated with the eyewear,
   a temple pivotably connected to one side of the frame by a hinge, the temple being movable with respect to the frame between folded and unfolded configurations,
   a first permanent magnet either disposed on or at least partially embedded within the frame on a first side of the power connector at a first location adjacent the hinge,
   a second permanent magnet either disposed on or at least partially embedded within the frame on a second side of the power connector at a second location adjacent the hinge, and
   a ferromagnetic malleable core wire at least partially embedded within the temple, the core wire including a first portion that extends nearly an entire length of the temple and a second portion that is positioned adjacent the hinge and adjacent the first and second locations when the temple is in the unfolded configuration, at least the second portion of the core wire being attracted to the first and second permanent magnets such that magnetic attraction retains the temple in the unfolded configuration when the temple is moved into the unfolded configuration.

2. The eyewear of claim 1, further comprising a second temple pivotably connected to an opposite side of the frame by a second hinge, and a third permanent magnet either disposed on or at least partially embedded within the frame at a location adjacent the second hinge.

3. A case for containing the eyewear of claim 2, wherein the first, second, and third permanent magnets are configured to be connected to respective magnets on the case in the folded configuration of the eyewear.

4. The eyewear of claim 2, further comprising a second ferromagnetic malleable core wire at least partially embedded within the second temple and including a portion that is positioned adjacent the second hinge when the second temple is in the unfolded configuration, wherein the third permanent magnet and the portion of the second core wire are attracted to each other so as to retain the second temple in the unfolded configuration when the second temple is moved to the unfolded configuration.

5. The eyewear of claim 1, wherein the power connector, the first permanent magnet, and the second permanent magnet are configured to connect to a power plug for supplying power to the eyewear.

6. The eyewear of claim 1, further comprising a camera mounted to the frame and connected to the power connector.

7. The eyewear of claim 6, further comprising a battery, a wireless transceiver, a data storage means, and a processor at least partially embedded within the frame and connected to the camera.

* * * * *